US 6,540,394 B2

(12) United States Patent
Juriga

(10) Patent No.: US 6,540,394 B2
(45) Date of Patent: Apr. 1, 2003

(54) KITCHEN APPLIANCE HAVING A REMOVABLE CONTAINER AND HAVING PROTECTION MEANS WHICH PERFORM THEIR PROTECTIVE FUNCTION IN THE CASE OF REMOVAL OF THE CONTAINER

(75) Inventor: Jan Juriga, Klagenfurt (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/945,955

(22) Filed: Sep. 4, 2001

(65) Prior Publication Data
US 2002/0071340 A1 Jun. 13, 2002

(30) Foreign Application Priority Data

Aug. 31, 2000 (EP) .............................. 00890267

(51) Int. Cl.⁷ .............................. A47J 43/046
(52) U.S. Cl. ................... 366/205; 366/206; 241/37.5
(58) Field of Search ..................... 366/96–98, 197, 366/199, 205, 206, 314, 601; 241/37.5; 99/348

(56) References Cited

U.S. PATENT DOCUMENTS

| 1,997,873 | A | * | 4/1935 | Poplawski |
| 2,284,155 | A | * | 5/1942 | Landgraf |
| 3,128,996 | A | * | 4/1964 | Kuzara |
| 3,612,126 | A | * | 10/1971 | Emmons et al. |
| 3,785,579 | A | * | 1/1974 | Voglesonger |
| 3,786,999 | A | * | 1/1974 | Cabell |
| 3,892,365 | A | * | 7/1975 | Verdun |
| 4,108,054 | A | * | 8/1978 | Klocker et al. |
| 4,111,372 | A | * | 9/1978 | Hicks et al. |
| 4,200,240 | A | * | 4/1980 | Machuron |
| 4,213,569 | A | * | 7/1980 | Amiot |
| 4,216,917 | A | * | 8/1980 | Clare et al. |

(List continued on next page.)

FOREIGN PATENT DOCUMENTS

| EP | 0120496 A1 | | 3/1984 |
| EP | 257705 | * | 3/1988 |
| EP | 571348 | * | 11/1993 |
| EP | 638273 | * | 2/1995 |
| FR | 2765467 A1 | | 8/1999 |
| GB | 2249368 | * | 5/1992 |
| GB | 2352648 | * | 2/2001 |

Primary Examiner—Charles E. Cooley
(74) Attorney, Agent, or Firm—Ernestine C. Bartlett

(57) ABSTRACT

A kitchen appliance (1) having a housing (2), a motor (6) and a protection device (9) by which the motor (6) can be turned off compulsively in certain operating conditions, and having a container (15) which can be closed with a cover (30) and which can be placed onto the housing (2) and which has a control slide (35) coupled to the cover (30) via a first coupling device (36) and also coupled to the protection device (9) via a second coupling device (37). Both the first coupling device (36) and the second coupling device (37) are constructed in such a manner that an automatic activation of the safety device (9) can be achieved by these two coupling devices (36, 37).

5 Claims, 2 Drawing Sheets

U.S. PATENT DOCUMENTS

| | | | | |
|---|---|---|---|---|
| 4,269,519 A | * | 5/1981 | Birr |
| 4,297,038 A | * | 10/1981 | Falkenbach |
| 4,335,860 A | * | 6/1982 | Grandel et al. |
| 4,371,118 A | * | 2/1983 | Sontheimer et al. |
| 4,373,677 A | * | 2/1983 | Kunihiro |
| 4,396,159 A | * | 8/1983 | Podell |
| 4,487,509 A | * | 12/1984 | Boyce |
| 4,506,836 A | * | 3/1985 | Williams |
| 4,629,131 A | * | 12/1986 | Podell |
| 4,691,870 A | * | 9/1987 | Fukunaga et al. |
| 4,741,482 A | * | 5/1988 | Coggiola et al. |
| 5,323,973 A | * | 6/1994 | Ferrara, Jr. |
| 5,338,111 A | * | 8/1994 | Trocherie et al. |
| 5,353,697 A | * | 10/1994 | Venturati et al. |
| 5,567,049 A | | 10/1996 | Beaudet et al. |
| 5,639,161 A | * | 6/1997 | Sirianni |
| 5,779,358 A | * | 7/1998 | Bevington |
| 5,809,872 A | * | 9/1998 | Sundquist |
| 6,112,649 A | * | 9/2000 | Jeong |
| 6,186,425 B1 | * | 2/2001 | Celso De Almeida Mattos |
| 6,209,810 B1 | * | 4/2001 | Brisard |
| 6,350,053 B1 | * | 2/2002 | Morin |
| 6,375,102 B1 | * | 4/2002 | Bouleau et al. |
| 2002/0012288 A1 | * | 1/2002 | Masip et al. |

* cited by examiner

KITCHEN APPLIANCE HAVING A REMOVABLE CONTAINER AND HAVING PROTECTION MEANS WHICH PERFORM THEIR PROTECTIVE FUNCTION IN THE CASE OF REMOVAL OF THE CONTAINER

BACKGROUND OF THE INVENTION

The invention relates to a kitchen appliance having a housing and a motor which is accommodated in the housing; having protection means for the motor accommodated in the housing; and having a container, which can be placed onto the housing and is removable from the housing. The container contains a derivable tool and can be closed by means of a cover, and has control means, which cooperate with the cover and aid in controlling the protection means of the kitchen appliance.

The invention further relates to a container for a kitchen appliance, which container has the features outlined briefly above.

Such a kitchen appliance and such a container are known from the patent document U.S. Pat. No. 5,567,049 A. In the known kitchen appliance the cover of the container must be placed onto the container in a comparatively accurate angular position relative to the container and must be pressed down onto the container parallel to the height direction of the container, in order to guarantee that the cover is locked to the container with the aid of a snap-on latching hook. This process requires a comparatively precise manipulation. A first coupling device couples the cover to the control means. Furthermore, the construction of the known kitchen appliance is such that the first coupling device has an arm which is led out of the cover towards the container, as a result of which this projecting arm is relatively likely to be damaged once the cover has been removed.

In the known kitchen appliance the arm of the first coupling device cooperates with a control slide provided in the handle portion of the container. The control slide forms the control means, and is adapted and arranged to cooperate with a safety slide. The safety slide forms a part of the protection means of the known kitchen appliance and is led through an upper wall of the housing of the known kitchen appliance. In the known kitchen appliance the safety slide is spring-loaded with the aid of a pressure spring, as a result of which the control slide, which is disposed in the container, is also spring-loaded by said pressure spring when the container is placed on the kitchen appliance.

In the known kitchen appliance the construction outlined above leads to the situation that with the aid of the force exerted on the control slide via the arm of the first coupling means, i.e. ultimately the force exerted on the cover by the user, the control slide provided as control means is actuated compulsively (that is, is forced to move) when the cover is brought into its closed position. With the aid of the safety slide, which projects from the kitchen appliance, the control slide is actuated by the force of the pressure spring when the cover is removed.

This construction creates the problem that the area where the safety slide projects from the housing of the known kitchen appliance may become soiled comparatively easily, which soiling in an unfavorable case may even extend up to the pressure spring provided as the return spring. As a result of this soiling it is no longer guaranteed that the safety slide is movable into its locking position by means of the force of the pressure spring. This leads to the disadvantage that in spite of the removal of the container from the known kitchen appliance, the safety slide is in its disengaging position and thus driving of the motor continues despite the removal of the container from the kitchen appliance. This result is unsafe and undesirable.

BRIEF SUMMARY OF THE INVENTION

It is an object of the invention to preclude the aforementioned problems and to provide an improved kitchen appliance and an improved container for a kitchen appliance.

In order to achieve the aforementioned object, characteristic features in accordance with the invention have been provided in a kitchen appliance in accordance with the invention. In such a kitchen appliance the container has control means, which are movable between a rest position and an active position and which are coupled to the cover via first coupling means and are coupled to the protection means via second coupling means. The first coupling means are arranged such that as a result of a movement of the cover from its open position into its closed position the control means are compulsively moved from their rest position into their active position by means of the force exerted on the control means by the cover via the first coupling means; and such that as a result of a movement of the cover from its closed position into its open position the control means are compulsively moved from their active position into their rest position by means of the force exerted on the control slide by the cover via the first coupling means.

The second coupling means is arranged such that as a result of a movement of the container from its placement position into its operating position the protection means are compulsively moved from their locking position into their disengaging position, and such that as a result of the movement of the container from its operating position into its placement position the protection means are compulsively moved from their disengaging position into their locking position.

In order to achieve the aforementioned object characteristic features in accordance with the invention have been provided in a container in accordance with the invention, in such a manner that a container in accordance with the invention can be characterized in the manner defined hereinafter, namely:

A container for a kitchen appliance, which container serves to hold a substance to be processed and which is adapted to be placed onto a housing of the kitchen appliance in the area of a housing wall of the housing and which by its placement onto the housing can be brought into a placement position on the housing and which is adapted to be movable from its placement position into an operating position and vice versa, in which operating position it is also disposed on the housing of the kitchen appliance in the area of the housing wall, and which contains a derivable tool for processing a substance present in the container, which tool, and which can be closed by means of a removable cover, which cover is movable relative to the container between an open position and a closed position, and which has control means, which are movable between a rest position and an active position and which are coupled to the cover via first coupling means and which, moreover, can be coupled to protection means of the kitchen appliance via second coupling means, in which the first coupling means have a construction which is such that as a result of a movement of the cover from its open position into its closed position the control means are compulsively movable from their rest position into their active position by means of the force exerted on the control means by the cover via the first coupling means, and in which the first coupling means further have a construction which is such that as a result of a movement of the cover from its closed position into its open position the control means are compulsively movable from their active position into their rest position by means of the force exerted on the control slide by the cover via the first coupling means, and in which the second coupling means have a construction which is such that as a result of a movement of the container from its placement position into its operating position the protection means are compulsively movable from their locking position into their disengaging position, and in which the second coupling means further have a construction which is such that as a result of the movement of the container from its operating position into its placement position the protection means are compulsively movable from their disengaging position into their locking position.

Owing to the provision of the measures in accordance with the invention it is achieved in a simple and cost-effective as well as space-saving manner that both during the movement of the cover from its open position into its closed position and during the movement of the cover from its closed position into its open position the control means and, consequently, protection means, which are coupled to the control means via the second coupling means, are always actuated compulsively, as a result of which it is not only guaranteed that starting of the motor of the kitchen appliance is enabled in a reliable manner upon closure of the cover but that it is also guaranteed that starting of the motor is inhibited in a reliable manner upon opening of the cover, thereby assuring that undesired continued operation of the motor is precluded. Furthermore, it is thus achieved that both when the container is moved from its placement position into its operating position and when the container is moved from its operating position into its placement position, which is also its removal position, the protection means are always actuated compulsively, which guarantees that starting of the motor of the kitchen appliance is always enabled in a reliable manner when a container is moved into its operating position and which guarantees that starting of the motor is always inhibited in a reliable manner when the container is moved into its placement position or removal position, thereby assuring that undesired continued operation of the motor is precluded.

In a kitchen appliance in accordance with the invention and in a container in accordance with the invention it has proved to be particularly advantageous when the first coupling means are formed by a pin-and-slot coupling because this forms a particularly reliable and trouble-free construction.

In a kitchen appliance in accordance with the invention it has further proved to be advantageous when the second coupling means are formed with the aid of a movable slide and two coupling pins which project from the slide as well as two inclined coupling surfaces, which are each adapted to cooperate with one of the two coupling pins and of which one coupling surface has been provided on the control means and the other coupling surface has been provided on the container.

The aforementioned aspects as well as further aspects of the invention will be apparent from the example of an embodiment described hereinafter and will be elucidated with the aid of this example.

The invention will be described in more detail hereinafter with reference to an embodiment which is shown in the drawings by way of example but to which the invention is not limited.

DETAILED DESCRIPTION OF THE INVENTION

Figure 1:
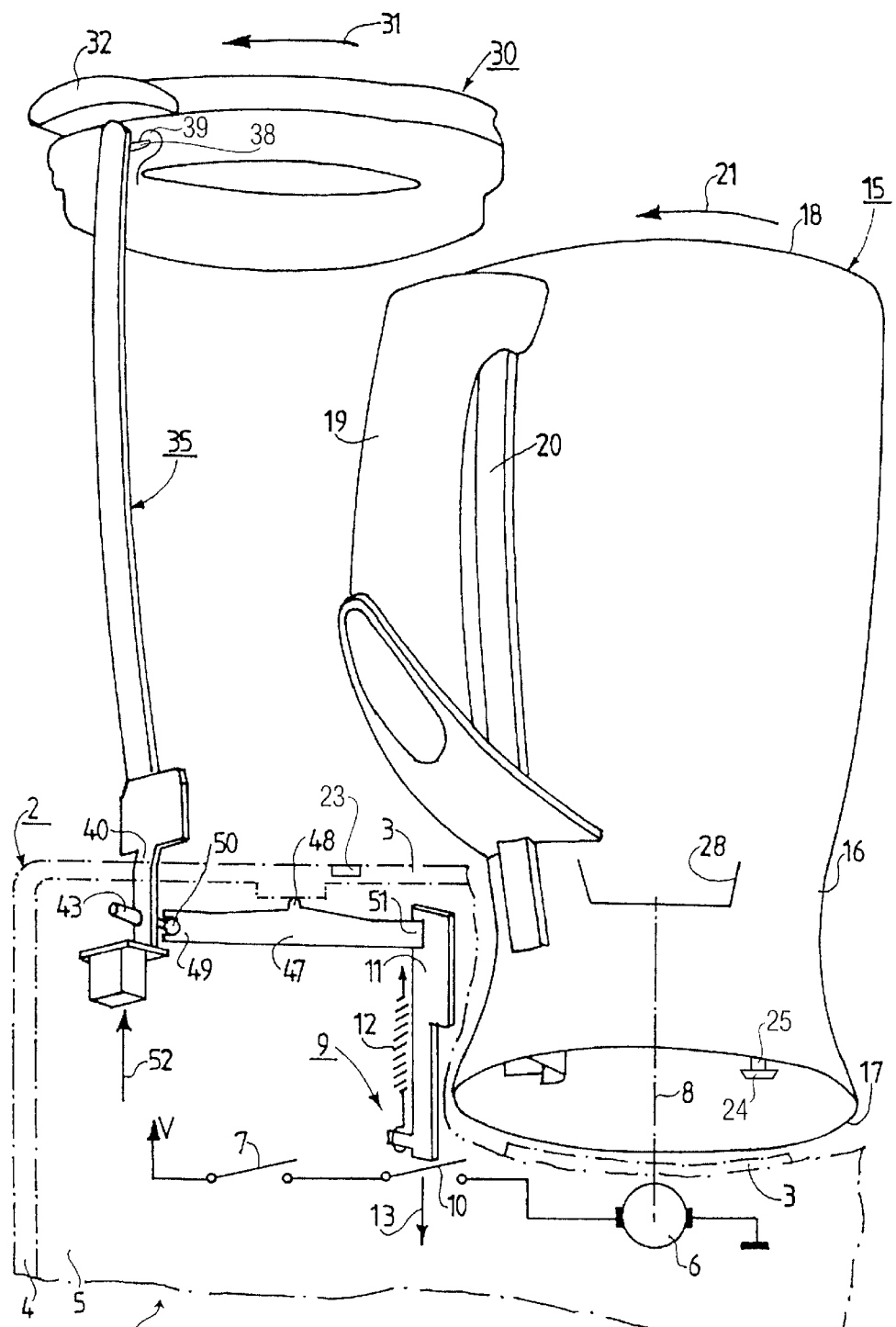
FIG. 1 shows a kitchen appliance with a container that can be placed onto the housing of the kitchen appliance in a highly diagrammatic manner, the container and parts of the container being shown in a diagrammatic oblique view.

FIG. 1 shows a kitchen appliance 1. The kitchen appliance 1 has a housing 2, which is shown in dash-dot lines in FIG. 1 and which has an upper wall 3 and a side wall 4 as well as a rear wall 5. The other walls of the housing 2 are not shown in FIG. 1. The housing 2 accommodates a motor 6, which can be turned on and turned off by the actuation of an on/off switch 7, namely in that a supply voltage V is connected or the supply voltage V is disconnected. The motor 6 can drive means 8, which are shown only diagrammatically in dash-dot lines in FIG. 1 and which extend through the upper wall 3 of the housing 2. A derivable tool can be driven with the aid of the drive means 8, which will be briefly described hereinafter.

The kitchen appliance 1 further has protection means 9, which are accommodated in the housing 2 and which are movable between a disengaging position, not shown in FIG. 1, and a locking position, shown in FIG. 1. The protection means 9 include a safety switch 10, which is included between the on/off switch 7 and the motor 6 in the motor circuit. The protection means 9 further include an actuating slide 11, which is acted upon by a return spring 12, which urges the actuating slide 11 towards its locking position shown in FIG. 1, the location of this locking position being defined with the aid of means, not shown. In the locking position the safety switch 10 is open and starting of the motor 6 is consequently inhibited. From the locking position of the actuating slide 11, which position is shown in FIG. 1, the actuating slide 11 is movable into a disengaging position, which is not shown in FIG. 1, which is effected against the force of the return spring. In the disengaging position the safety switch 10 is closed, thus allowing the motor 6 to be started.

The kitchen appliance 1 further has a container 15. The container has a circumferential wall 16, which ends in a bottom area 17 at one side and in a top area 18 at the other side. In the area of the circumferential wall 16 a grip 19 is connected to the container 15. In the area of the circumferential wall 16 a masking portion 20 extends parallel to the grip 19, which masking portion is integral with the circumferential wall 16 and serves to mask a guide channel 20G, which is not shown in FIG. 1 but is visible in FIG. 2.

The container 15 serves to hold a substance to be processed. The container 15 can be placed onto the housing 2, namely in the area of the upper wall 3 of the housing 2. By placing the container 15 onto the housing 2 the container is movable into a placement position 15A, as is indicated in the right-hand part of FIG. 2, the placement position 15A of the container 15 being shown in broken lines. The container 15 can be brought from its placement position 15A into an operating position 15B, which is shown in solid lines in the left-hand part of FIG. 2. In the present case, the container 15 can be moved, i.e. rotated, output of its placement position 15A in a direction indicated by an arrow 21. In its operating position 15B the container 15 is positioned on the housing 2 in the area of the upper wall 3. The container 15 and the housing 2 are equipped with a so-called bayonet device 22 having a bayonet ridge 23, which is connected to the housing 2, i.e. the upper wall 3, and which projects from the upper wall 3, and having a bayonet lock 24, which is connected to the container 15 via a connecting limb 25. When the container 15 is placed into its placement position 15A, the bayonet lock 24 engages a recess 26 in the upper wall 3 of the housing 2. When the container 15 is subsequently rotated into operating position 15B as indicated by the arrow 21 the bayonet lock 24 is brought into a position in which it engages behind or underneath the bayonet ridge 23. Upon completion of the rotation of the container 15 the connecting limb 25 abuts against a stop surface 27, which defines the operating position 15B of the container 15. In this operating position the bayonet lock 24 engages behind the bayonet ridge 23.

The container 15 contains a rotationally derivable tool 28 for processing a substance present in the container 15. When the container 15 is in its operating position 15B the tool 28 can be driven by the motor 6.

The container 15 can be closed by means of a cover 30. The cover 30 is movable relative to the container 15 between an open position 30A and a closed position 30B. In the present case, the movement between the open position 30A and the closed position 30B is possibly by rotation. The rotation of the cover 30 from its open position 30A into its closed position 30B is effected in a direction indicated by an arrow 31. The cover 30 has a laterally projecting cap 32, which is flush with the grip 19 of the container 15 when the cover 30 has been placed onto the container 15 and the cover 30 has been rotated into its closed position 30B.

Figure 2:
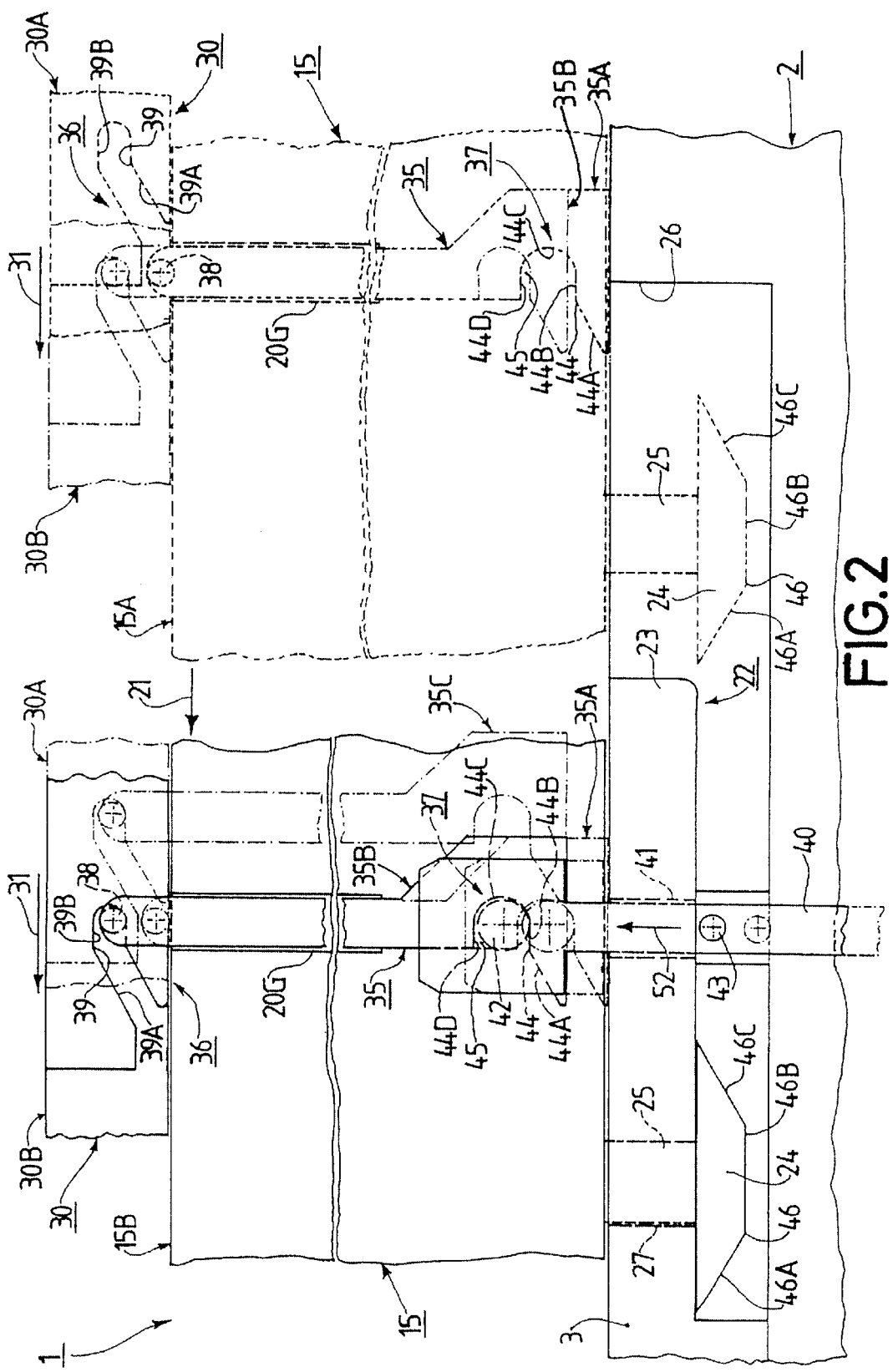
FIG. 2 is a partly diagrammatic plan view of a part of the housing of the kitchen appliance and the container as well as a cover for the container of the kitchen appliance shown in FIG. 1.

The container 15 further has control means 35, which in the present case are simply formed by a control slide 35. The control slide 35 is guided in the guide channel 21 in the area of the circumferential wall 16 of the container 15 so as to be movable in its longitudinal direction. The control slide 35 is movable between a rest position 35A, which is shown in FIG. 2, and an active position 35B, which is also shown in FIG. 2. With the aid of means, not shown, the control slide 35 is locked against disengagement.

At its end which faces the upper area 18 of the container 15 the control slide 35 is coupled to the cover 30 via first coupling means 36, which are not shown in FIG. 1. At its end which faces the bottom area 17 of the container 15 the control slide 35 is coupled to the protection means 9 via second coupling means 37.

In the present case, the first coupling means 36 have a construction which is such that as a result of a movement of the cover 30 from its open position 30A into its closed position 30B the control slide 35 is compulsively moved from its rest position into its active position 35B by means of the force exerted on the control slide 35 by the cover 30 via the first coupling means 36. Furthermore, the first coupling means 36 have a construction which is such that as a result of a movement of the cover 30 from its closed position 30B into its open position 30A the control slide 35 is compulsively moved from its active position 35B into its rest position 35A by means of the force exerted on the control slide 35 by the cover via the first coupling means 36.

The second coupling means 37 have a construction which is such that as a result of a movement of the container 15 from its placement position 15A into its operating position 15B the protection means 9 are compulsively moved from their locking position into their disengaging position. The second coupling means 37 further have a construction which is such that as a result of a movement of the container 15 from its operating position 15B into its placement position 15A the protection means 9 are compulsively moved from their disengaging position into their locking position.

In the present case, the first coupling means 36 by a pin-and-slot coupling 36. The pin-and-slot coupling 36 now consists of a coupling pin 38, which projects laterally from the control slide 35 and of a coupling slot 39 formed in the cover 30. The coupling slot 39 has a first portion 39A and a second portion 39B. The first portion 39A extends in a direction which is inclined with respect to the direction of movement 31 of the cover 30 relative to the container 15. The second portion 39B extends parallel to the direction of movement 31 of the cover 30 relative to the container 15. As regards the coupling slot 39 it is to be noted that the coupling slot 39 of the pin-and-slot coupling 36 is open in the area of the end of the coupling slot 39 where the coupling pin 38 is situated when the cover 30 is in its open position 30A.

The second coupling means 37 include a coupling slide 40, which extends through the upper wall 3 of the housing 2 and which is led through a passage 41 in the upper wall 3. The coupling slide 40 has a first coupling pin 42 and a second coupling pin 43, which pins project from the coupling slide 40. The first coupling pin 42 serves to cooperate with the control slide 35. For the cooperation with the first coupling pin 42 the control slide 35 has a coupling surface 44, which comprises a first portion 44A and a second portion 44B. The first portion 44A extends in a direction which is inclined with respect to the direction of movement of the container 15 relative to the housing 2. The second portion 44B extends parallel to the direction of movement 21 of the container 15 with respect to the housing 2. The second portion 44B of the coupling surface 44 changes to a circularly curved surface portion 44C, which in its turn changes into a surface portion 44D which extends parallel to the second portion 44B. The second portion 44B of the coupling surface 44 and the two surface portions 44C and 44D enclose a recess 45, in which recess 45 the first coupling pin 42 is engageable. The second coupling pin 43 serves to cooperate with the container 15. The container 15 has a coupling surface 46 for cooperation with the second coupling pin 43, which surface has a first portion 46A and a second portion 46B as well as a third portion 46C. The first portion 46A and the third portion 46C each extend in a direction which is inclined with respect to the direction of movement 21 of the container 15 relative to the housing 2. The second portion 46B extends parallel to the direction of movement 21 of the container 15 with respect to the housing 2. In the present case, the coupling surface 46 is formed by the bounding surface of the bayonet lock 24.

As is apparent from FIG. 1, the second coupling means 37 include, in addition to the coupling slide 40, a coupling lever 47. The coupling lever 47 is arranged so as to be pivotable with respect to the upper wall 3 of the housing 2 with the aid of a projection 48. In the area of its end 49 the coupling lever 47 is articulated to the coupling slide 40 via an articulated joint 50. In the area of its other end 51 the coupling lever 47 is articulated to the actuating slide 11 in a manner not shown.

The operation of the protection means 9 and the control means 35, i.e. of the control slide 35 and of the first coupling means 36 and the second coupling means 37, will be described hereinafter.

It is assumed that the container 15 without the cover 30 is brought into its placement position 15A, as is shown diagrammatically in broken lines in the right-hand part of FIG. 2. In this case, the control slide 35 is in its rest position 35A.

Starting from this situation two schemes are possible, i.e. in accordance with a first scheme the cover 30 can be placed onto the container 15, after which the cover 30 is in its open position 30A, and subsequently the cover 30 can be rotated from its open position 30A into its closed position 30B and substantially the container 15 can be rotated in the direction indicated by the arrow 21 from its placement position 15A into its operating position 15B, or in accordance with a second scheme the container 15, which has first been brought into its placement position 15A, can be moved into its operating position 15B in the direction indicated by the arrow 21 and subsequently the cover can be placed onto the container 15 and can thus be brought into its open position 30A, after which the cover can be turned from its open position 30A into its closed position 30B in the direction indicated by the arrow 31.

When in accordance with the first scheme the cover 30 is first placed onto the container 15 and is subsequently rotated from its open position 30A into its closed position 30B, this rotation of the cover 30 from its open position 30A into its closed position 30B causes the coupling slot 39, via the coupling pin 38, to move the control slide 35 into the active position 35B of the control slide 35, as shown in dash-dot lines in the right-hand part of FIG. 2. When subsequently the container 15 is rotated in the direction indicated by the arrow 21 from its placement position 15A into its operating position 15B, upon which the control slide 35, which is situated in the container 35 and is now in its active position 35B, as well as the bayonet lock 24 of the container are actuated, the first portion 46A of the coupling surface 46 on the bayonet lock 24 first enters into operative engagement with the second coupling pin 43 when, for whatever reason, the second coupling pin 43 is not in its position corresponding to the locking position of the protection means 9, as a result of which the protection means 9 are compulsively moved into their locking position with the aid of the coupling surface 45. As the movement proceeds, the bayonet lock 24 is moved away from the second coupling pin 34 in the direction indicated by the arrow 21, as a result of which the second coupling pin 43 is disengaged. Subsequently, when the container 15 is rotated in the direction indicated by the arrow 21, the control slide 35, which is in its active position 35B, assumes an intermediate position 35C, which is shown in dash-dot lines in the left-hand part of FIG. 2 and in which the coupling surface 44 enters into operative engagement with the second coupling pin 42 (in its position shown dotted). As the movement of the container 15 including the control slide 35 in the direction indicated by the arrow 21 continues the coupling surface 44 causes the first coupling pin 42 to be moved in a direction indicated by an arrow 52, as a result of which the coupling slide 40 is also moved in the direction indicated by the arrow 52. This causes the coupling lever 47 to be pivoted, as a result of which the actuating slide 11 is moved in the direction indicated by the arrow 13 against the force of the return spring 12 and thereby causes the safety switch 10 to be closed. After this sequence of events the container 15 is in its operating position 15B and the cover is in its closed position 30B, as is required for a correct and safe operation, so that owing to the closed safety switch 10 the motor 6 can be started with the aid of the on/off switch 7 and, as a consequence, processing of a substance loaded into the container 15 is possible.

When, in accordance with the second scheme, after placement of the container 15 onto the housing 2, the container 15, without the cover 30 being closed, is rotated in the direction indicated by the arrow 21 from its placement position 15A into its operating position 15B the control slide 35 will be in its rest position 35A. When in this case the container 15 is rotated into its operating position 15B the coupling surface 46 of the bayonet lock 24 again enters into operative engagement the second coupling pin 43. Subsequently, the bayonet lock, i.e. its coupling surface 46, again disengages the second coupling pin 30. Subsequently, as a result of the rotation of the container 15B into its operating position 15B, which is shown in the left-hand part of FIG. 2, the control slide 35, which is still in its rest position 35A, is brought into a position relative to the coupling slide 40 and the second coupling pin 42 (the position shown in dash-dot lines) in which the second portion 44B of the coupling surface 44 engages underneath the first coupling pin 42. When subsequently the cover 30 is turned from its open position 30A into its closed position 30B as indicated by the arrow 31, the coupling pin 38, which is located in the area of the cover 30, is lifted by means of the coupling slot 39 in the direction indicated by the arrow 52, as a result of which the first coupling pin 42 is also lifted in the direction indicated by the arrow 52 with the aid of the second portion 44B of the coupling surface 44 of the control slide 35, which results in the protection means 9 being moved into their disengaging position, as already described hereinbefore. This again enables operation of the kitchen appliance 1.

When, while the container 15 is in its operating position 15B and the cover 30 is in its closed position 30B, the cover 30 is turned from its closed position 30B into its open position 30A in a direction opposite to that indicated by the arrow 31, this causes the control slide 35 to be moved compulsively in a direction opposite to that indicated by the arrow 52 with the aid of the pin-and-slot coupling 36, as a result of which the coupling slide 40 is compulsively moved direction opposite to that indicated by the arrow 52 with the aid of the control slide 35 and the first coupling pin 42, which engages the recess 45 in the control slide 35, which compulsively causes the protection means 9 to be moved into their locking position. When upon opening of the cover 30 the motor is still energized via the on/off switch 7, this will result in the motor 9 being turned off immediately via the safety switch 10 of the protection means 9, turning off being effected compulsively, thus guaranteeing a very high degree of safety for the present kitchen appliance 1.

When, while the container 15 is in its operating position 15B and the cover 30 is in its closed position 30B, the container 15 is rotated out of its operating position 15B in a direction opposite to that indicated by the arrow 21 this causes the coupling surface 44 of the control slide 35 to be moved away from the first coupling pin 42 of the coupling slide 40 in the direction opposite to that indicated by the arrow 21, as a result of which the coupling slide 40 is disengaged from the control slide 35. Subsequently, during the rotation of the container 15 in the direction opposite to that indicated by the arrow 21, the third portion 46C of the coupling surface 46 of the bayonet lock 24 enters into operative engagement with the second coupling pin 43, after which the second coupling pin 43 is compulsively moved in the direction opposite to that indicated by the arrow 52 with the aid of the third portion 46C of the coupling surface 46, as a result of which the coupling slide 40 is moved compulsively and, as a consequence, the protection means 9 are moved compulsively into their locked position. Thus, the protection means 9 also ensure a reliable blocking in this operating condition, as a result of which the motor 6 is switched off in a reliable manner.

In the kitchen appliance in accordance with the embodiment described hereinbefore by way of example the first coupling means are formed by a pin-and-slot coupling and the second coupling means are formed with the aid of two coupling pins arranged on a coupling slide and two coupling surfaces adapted to cooperate with the coupling pins, one being provided on the control slide and the other one on the container. It is to be noted that it is alternatively possible to provide a pin-and-slot coupling as second coupling means between the control means and the protection means and to provide first coupling means between the control means and the cover for the container, which first coupling means comprise a coupling surface on the cover and another coupling surface on the container, which two coupling surfaces then each cooperate with a coupling pin arranged on a coupling slide. Furthermore, it is to be noted that the two coupling means may also be realized in another manner, for example with the aid of gear transmissions comprising toothed racks and toothed wheels.

What is claimed is:

1. A kitchen appliance comprising:

a housing having a housing wall, a motor accommodated in the housing, means for turning said motor on and turned off, drive means which can be driven by said motor, and extend through said housing wall, protection means, accommodated in the housing and arranged to be movable between a locking position and a disengaging position, in the locking position said protection means inhibiting starting of the motor, and in the disengaging position said protection means allowing the motor to be started, and a container for holding a substance to be processed and arranged to be placed onto the housing adjacent the housing wall in a placement position, and to be is movable from said placement position into an operating position, in said operating position said container being disposed on the housing adjacent the housing wall, said container having a removable cover for closing the container, and containing a derivable tool for processing a substance present in the container, said tool, when the container is in its operating position, being derivable with the aid of the drive means, said cover being movable relative to the container between an open position and a closed position, said container including control means, movable between a rest position and an active position, said control means being coupled to the cover via first coupling means, and being coupled to the protection means via second coupling means, said first coupling means being arranged such that as a result of a movement of the cover from its open position into its closed position, the control means is compulsively moved from the rest position into the active position by means of the force exerted on the control means by the cover via the first coupling means, and as a result of a movement of the cover from its closed position into its open position the control means is compulsively moved from the active position into the rest position by means of the force exerted on the control means by the cover via the first coupling means, and said second coupling means being arranged such that as a result of a movement of the container from the placement position into the operating position the protection means is compulsively moved from the locking position into the disengaging position, and such that as a result of the movement of the container from the operating position into the placement position the protection means is compulsively moved from the disengaging position into the locking position.

2. A kitchen appliance comprising:

a housing having a housing wall, a motor accommodated in the housing, means for turning said motor on and turned off, drive means which can be driven by said motor, and extend through said housing wall, protection means, accommodated in the housing and arranged to be movable between a locking position and a disengaging position, in the locking position said protection means inhibiting starting of the motor, and in the disengaging position said protection means allowing the motor to be started, and a container for holding a substance to be processed and arranged to be placed onto the housing adjacent the housing wall in a placement position, and to be is movable from said placement position into an operating position, in said operating position said container being disposed on the housing adjacent the housing wall, said container having a removable cover for closing the container, and containing a drivable tool for processing a substance present in the container, said tool, when the container is in its operating position, being derivable with the aid of the drive means, said cover being movable relative to the container between an open position and a closed position, said container including control means, movable between a rest position and an active position, said control means being coupled to the cover via first coupling means, and being coupled to the protection means via second coupling means, said first coupling means being arranged such that as a result of a movement of the cover from its open position into its closed position, the control means is compulsively moved from the rest position into the active position by means of the force exerted on the control means by the cover via the first coupling means, and as a result of a movement of the cover from its closed position into its open position the control means is compulsively moved from the active position into the rest position by means of the force exerted on the control means by the cover via the first coupling means, and said second coupling means being arranged such that as a result of a movement of the container from the placement position into the operating position the protection means is compulsively moved from the locking position into the disengaging position, and such that as a result of the movement of the container from the operating position into the placement position the protection means is compulsively moved from the disengaging position into the locking position, said second coupling means comprising a coupling slide which extends through said housing wall, said coupling slide being connected to a first coupling pin and to a second coupling pin, and said control means having a coupling surface for cooperation with the first coupling pin, which coupling surface extends at least partly in a direction which is inclined with respect to the direction of movement of the container with respect to the housing, and said container having a coupling surface for cooperation with the second coupling pin, said coupling surface extending at least partly in a direction which is inclined with respect to the direction of movement of the container with respect to the housing.

3. A container for a kitchen appliance having drive means, protection means for inhibiting said drive means, and a housing with a housing wall, said container being arranged for holding a substance to be processed, said container being adapted to be placed onto the housing adjacent the housing wall in a placement position, and to be movable from said placement position into an operating position, in said operating position said container being disposed on the housing adjacent the housing wall, said container having a removable cover for closing the container, and containing a drivable tool for processing a substance present in the container, said tool, when the container is in its operating position, being derivable with the aid of the drive means, said cover being movable relative to the container between an open position and a closed position, said container including control means, movable between a rest position and an active position, said control means being coupled to the cover via fist coupling means, and being coupled to the protection means via second coupling means, said first coupling means being arranged such that as a result of a movement of the cover from its open position into its closed position, the control means is compulsively moved from the rest position into the active position by means of the force exerted on the control means by the cover via the first coupling means, and as a result of a movement of the cover from its closed position into its open position the control means is compulsively moved from the active position into the rest position by means of the force exerted on the control means by the cover via the first coupling means, and said second coupling means being arranged such that as a result of a movement of the container from the placement position into the operating position the protection means is compulsively moved from the locking position into the disengaging position, and such that as a result of the movement of tie container from the operating position into the placement position the protection means is compulsively moved from the disengaging position into the locking position.

4. A container as claimed in claim 3, in which the first coupling means is formed by a pin-and-slot coupling, and in which the slot of the pin-and-slot coupling extends at least partly in a direction which is inclined with respect to the direction of movement of the cover.

5. A container as claimed in claim 4, in which the slot of the pin-and-slot coupling is open in the area of that end of the slot where the pin is situated when the cover is in its open position.

* * * * *